United States Patent
Edwards et al.

(10) Patent No.: US 9,605,096 B2
(45) Date of Patent: Mar. 28, 2017

(54) METHODS FOR POLYOLEFIN POLYMERIZATION WITH HIGH ACTIVITY CATALYST SYSTEMS

(71) Applicant: ExxonMobil Chemical Patents Inc., Baytown, TX (US)

(72) Inventors: Todd S. Edwards, League City, TX (US); Kevin W. Lawson, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 351 days.

(21) Appl. No.: 14/296,616

(22) Filed: Jun. 5, 2014

(65) Prior Publication Data

US 2015/0031842 A1  Jan. 29, 2015

Related U.S. Application Data

(60) Provisional application No. 61/858,457, filed on Jul. 25, 2013.

(30) Foreign Application Priority Data

Sep. 20, 2013 (EP) .................................... 13185277

(51) Int. Cl.
  *C08F 210/06* (2006.01)
  *C08F 2/00* (2006.01)
  *C08F 10/00* (2006.01)
  *C08F 110/06* (2006.01)

(52) U.S. Cl.
  CPC .............. *C08F 210/06* (2013.01); *C08F 2/00* (2013.01); *C08F 10/00* (2013.01); *C08F 110/06* (2013.01)

(58) Field of Classification Search
  None
  See application file for complete search history.

(56) References Cited

U.S. PATENT DOCUMENTS

| 3,198,605 | A | 8/1965 | Bayles |
| 2003/0232715 | A1 | 12/2003 | Katzen et al. |
| 2006/0089251 | A1* | 4/2006 | Brita ........................ C08F 10/00 502/123 |
| 2011/0034645 | A1* | 2/2011 | Standaert .............. C08F 110/06 526/65 |

FOREIGN PATENT DOCUMENTS

| EP | 1 378 528 | 1/2004 |
| EP | 1 930 353 | 6/2008 |
| EP | 2 062 924 | 5/2009 |
| WO | WO 2004/055065 | 7/2004 |

OTHER PUBLICATIONS

Malpass, Introduction to Industrial Polyethylene: Properties, Catalysts, Processes, p. 38 (2010).*

* cited by examiner

*Primary Examiner* — Catherine S Branch

(57) ABSTRACT

A method is provided for polymerizing an olefin monomer in a reactor with a highly active polyolefin polymerization catalyst system. The method includes introducing a catalyst system comprising a catalyst and a catalyst activator into the reactor containing the olefin monomer with less than 10 seconds or no pre-contacting time of the catalyst and the catalyst activator prior to introducing the catalyst and the catalyst activator into the reactor. The catalyst system may have a standard adjusted catalyst activity of greater than 10 gPgcat$^{-1}$hr$^{-1}$.

21 Claims, 2 Drawing Sheets

US 9,605,096 B2

METHODS FOR POLYOLEFIN POLYMERIZATION WITH HIGH ACTIVITY CATALYST SYSTEMS

PRIORITY CLAIMS

The present application claims priority to and the benefit of U.S. Ser. No. 61/858,457 filed on Jul. 25, 2013 and EP Application No. 13185277.4 filed Sep. 20, 2013, the disclosure of which is hereby incorporated by reference herein in their entireties.

FIELD OF INVENTION

This invention relates to polyolefin polymerization and more particularly to polyolefin polymerization with high activity catalyst systems.

BACKGROUND OF THE INVENTION

In many polyolefin polymerization processes, catalyst is prepared for delivery to the polymerization process by activating the catalyst solids in a continuous process commonly referred to as pre-contacting. This pre-contacting step was developed to ensure that the catalyst solids, such as a Ziegler-Natta "Generation III, IV or V" catalyst with a titanium polymerization site in its Ti(IV) state, were activated via an activator, such as a metal alkyl, e.g., triethylaluminum ("TEA1"), to reduce the titanium polymerization site to its active Ti(III) state.

Pre-contacting is often accomplished by introduction of the catalyst (in the form of catalyst solids) and the activator (sometimes diluted in an alkane solvent, such as hexane) into a pre-contacting vessel, where the catalyst and activator are allowed to mix and react for a pre-contacting time of typically 10 to 20 minutes outside the presence of the olefin monomers. In some processes, the catalyst is further pre-contacted with an external donor system to ensure thorough complexation of the external donor with the active polymerization site to influence the stereoregularity of the resulting polyolefin. In such cases, the external donor may be diluted in a solvent, such as mineral oil, prior to being added to the pre-contacting vessel.

If the catalyst system is not sufficiently active, low levels of pre-polymerization are observed during the subsequent pre-polymerization step. It has been demonstrated that low levels of pre-polymerization under the mild pre-polymerization conditions can translate to poor product morphology, such as broken granules, low bulk density and high fines content. In addition, insufficient time for external donor complex formation can result in reduced product crystallinity.

Injection of the activated catalyst system into the pre-polymerization reactor has been and continues to become more challenging as the newer Ziegler-Natta catalyst systems achieve higher levels of activity. Even under the very mild conditions where the active catalyst first comes into contact with monomer, the activity can be high enough to cause polymer formation and plugging in the injection systems, resulting in reduced reliability of the production facility and other issues associated with injector plugging and reactor fouling.

Most of the reliability improvement development work in this area has been directed to tempering the reaction conditions at the point where the active catalyst solids first contact monomer, including colder injection conditions (e.g., reducing the monomer feedstream temperature to as low as −20° C. or lower); higher monomer feedstream flow velocities; or monomer dilution (e.g., with propane or other inert hydrocarbons). Each of these solutions has associated disadvantages, including increased operating costs, lower process efficiency, and reduced catalyst productivity. It would therefore be desirable to provide a solution to the problems associated with the use of high-activity catalysts in such polyolefin polymerization processes while reducing or eliminating such disadvantages.

SUMMARY OF THE INVENTION

It has been found that when using high-activity catalyst systems in polyolefin polymerization processes, suitable catalyst activity can be achieved with significantly limited or no catalyst and activator pre-contacting time, thus reducing or avoiding many of the complications associated with catalyst and activator pre-contacting, while maintaining the catalyst productivity capability necessary to ensure adequate levels of pre-polymerization (to avoid poor product morphology) and good overall productivity.

In one aspect, a method is provided for polymerizing an olefin monomer in a reactor with a highly active polyolefin polymerization catalyst system. The method includes introducing a catalyst system comprising a catalyst and a catalyst activator into the reactor containing the olefin monomer with less than 10 seconds or no pre-contacting time of the catalyst and the catalyst activator prior to introducing the catalyst and the catalyst activator into the reactor. In any embodiment, the catalyst system may have a standard adjusted catalyst activity of greater than 10 $gPgcat^{-1}hr^{-1}$.

In another aspect, a method is provided for polyolefin polymerization. The method includes introducing (i) a Ziegler-Natta catalyst having a Ti polymerization matrix and an internal electron donor and (ii) a catalyst activator into a reactor containing an olefin monomer with less than 10 seconds or no pre-contacting time of the catalyst and the catalyst activator prior to introducing the catalyst and catalyst activator in the reactor.

In yet another aspect, a method is provided for polyolefin polymerization that includes introducing a catalyst system into a reactor containing an olefin monomer; wherein the catalyst system comprises: a catalyst having a titanium polymerization site in a Ti(IV) state, an activator suitable for reducing the titanium polymerization site from the Ti(IV) state to an activated Ti(III) state; and wherein the catalyst and the activator are introduced into the reactor with less than 10 seconds or no pre-contacting time.

DETAILED DESCRIPTION OF THE INVENTION

Figure 1:
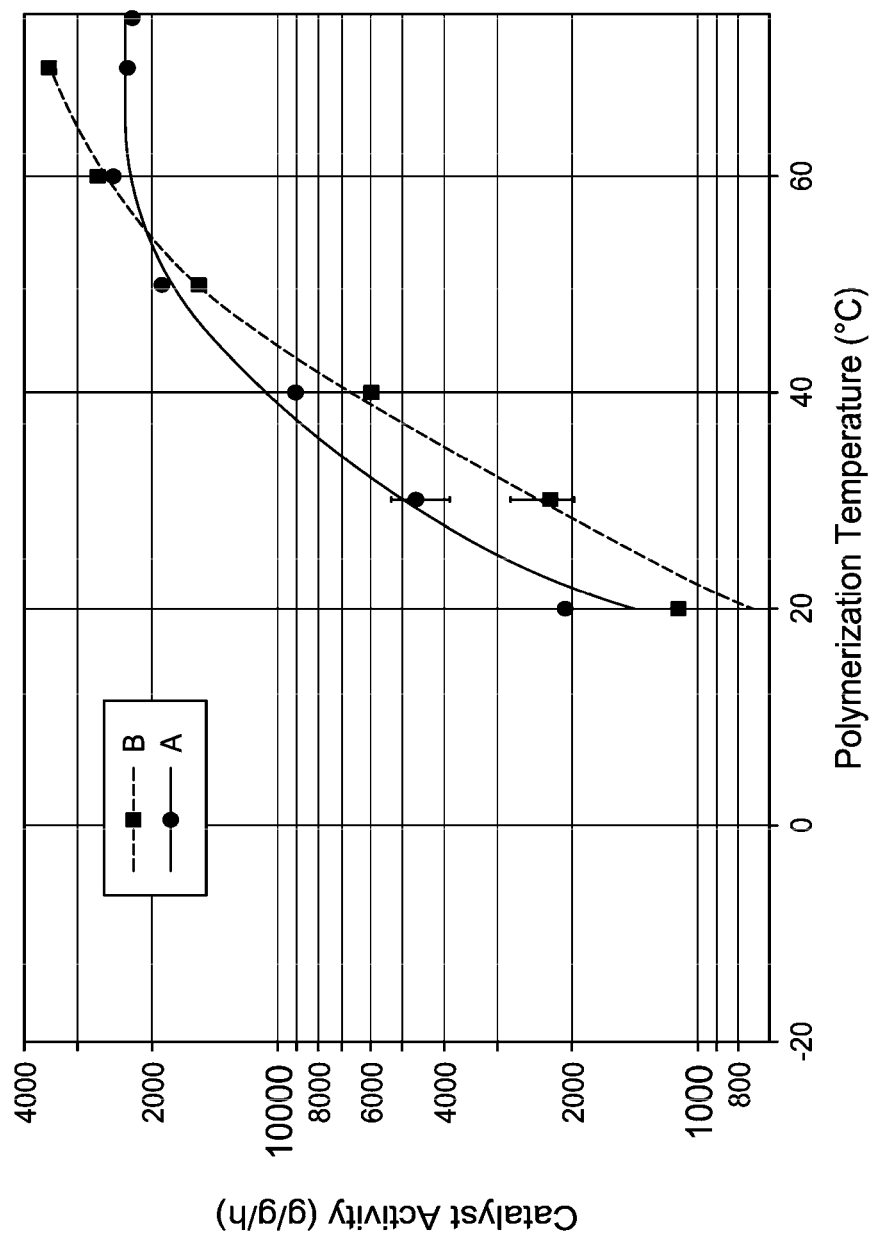
FIG. 1 shows a temperature vs. catalyst activity plot for two highly active catalyst systems, catalyst systems A and B, useful in one or more embodiments of the present invention.

A method for reliably operating a polyolefin polymerization process when using high-activity catalyst systems, such as catalyst system utilizing a Generation IV or later Ziegler- Natta catalyst. It has been found that suitable catalyst productivity can be achieved with significantly limited or no catalyst and activator pre-contacting time, thus reducing or avoiding many of the complications associated with catalyst and activator pre-contacting.

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition, two or more such hydrocarbyl radicals may together form a fused ring system, including partially or fully hydrogenated fused ring systems, which may include heterocyclic radicals.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

For purposes herein, unless otherwise stated, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, unless otherwise stated, hydrocarbyl radicals may also include isomers of saturated, partially unsaturated and aromatic cyclic structures wherein the radical may additionally be subjected to the types of substitutions described above. The term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

For purposes herein the term "non-aromatic" refers to compounds, radicals, and/or functional groups without aromatic character attributed to cyclic conjugated $sp^2$ carbons having protons with a chemical shift relative to TMS consistent with aromatic protons, or greater than 6, as readily understood by one of minimal skill in the art.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Likewise the terms "functional group", "group" and "substituent" are also used interchangeably throughout this document unless otherwise specified. For purposes herein, a functional group includes both organic and inorganic radicals or moieties comprising elements from Groups 13, 14, 15, 16, and 17 of the periodic table of elements. Suitable functional groups may include hydrocarbyl radicals, e.g., alkyl radicals, alkene radicals, aryl radicals, and/or halogen (Cl, Br, I, F), O, S, Se, Te, $NR^*_x$, $OR^*$, $SeR^*$, $TeR^*$, $PR^*_x$, $AsR^*_x$, $SbR^*_x$, $SR^*$, $BR^*_x$, $SiR^*_x$, $GeR^*_x$, $SnR^*_x$, $PbR^*_x$, and/or the like, wherein R is a $C_1$ to $C_{20}$ hydrocarbyl as defined above, and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso, and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

For purposes herein, a supported catalyst and/or activator refers to a catalyst compound, an activator, or a combination thereof located on, in, or in communication with a support wherein the activator, the catalyst compound, or a combination thereof are deposited on, vaporized with, bonded to, incorporated within, adsorbed or absorbed in, adsorbed or absorbed on, the support.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst" and "catalyst compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator, an internal electron donor, one or more external electron donors, and/or a co-catalyst to initiate catalysis. When the catalyst compound is combined with electron donors and/or co-catalysts to initiate catalysis, the catalyst compound is often referred to as a pre-catalyst or catalyst precursor. A "catalyst system" is a combination of at least one catalyst compound, at least one internal electron donor, one or more external electron donors, a co-catalyst, and/or a support where the system can polymerize monomers to produce a polymer under polymerization conditions of suitable temperature and pressure.

For purposes herein the term "catalyst activity" is a measure of how many grams of polymer (P) are produced using a polymerization catalyst comprising (W) grams of catalyst (cat), over a period of time of (T) equal to 1 hour measured from the initiation of catalytic polymerization; and may be expressed by the following formula: P/(T×W) and expressed in units of gPgcat$^{-1}$hr$^{-1}$. "Conversion" is the amount of monomer that is converted to polymer product, and is reported as wt % and is calculated based on the polymer yield and the amount of monomer fed into the reactor. Because the activity of a catalyst system can be affected by reactor temperature and catalyst-activator pre-contacting conditions, the term "standard adjusted catalyst activity" as used herein refers to a catalyst system's activity under the following standard conditions: (a) catalyst and activator are mixed and allowed to pre-contact for a period of time of at least 10 minutes, and (b) catalyst and activator are injected into a reactor having a monomer feedstream temperature of 5° C. at the injection point. It should be appreciated that "standard adjusted catalyst activity" therefore is a standardized measure of a given catalyst system's activity under defined conditions and is not intended to imply or require that the referenced catalyst system actually be employed in a process under such conditions. For example, reference may be made to a catalyst's "standard adjusted catalyst activity" even where the catalyst is used in a process where there is no pre-contacting of catalyst and activator or where pre-contacting time is limited to 10 seconds or less or where the reactor is operated at a different temperature at the catalyst injection point. In certain embodiments, the methods disclosed herein advantageously may be employed with catalyst systems having high standard adjusted catalyst activity. Thus, standard adjusted catalyst activity as defined herein is a helpful catalyst property for identifying certain catalyst systems useful in the methods disclosed herein.

A "scavenger" is a compound that is typically added to facilitate oligomerization or polymerization by scavenging impurities. Some scavengers may also act as activators and may be referred to as co-activators. A co-activator, that is not a scavenger, may also be used in conjunction with an activator in order to form a catalyst system. In an embodiment, a co-activator can be pre-mixed with the catalyst compound to form an alkylated catalyst compound.

A "propylene polymer" or "polypropylene" is a polymer having at least 50 mol % of propylene. As used herein, Mn is number average molecular weight as determined by proton nuclear magnetic resonance spectroscopy ($^1$H NMR) or by gel permeation chromatography (GPC) unless stated otherwise, Mw is weight average molecular weight determined by gel permeation chromatography (GPC), and Mz is z average molecular weight determined by GPC, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl, and MAO is methylalumoxane. For purposes herein, "RT" is room temperature, which is defined as 25° C. unless otherwise specified. All percentages are in weight percent (wt %) unless otherwise specified.

For purposes herein, Mw, Mz number of carbon atoms, g value and $g'_{vis}$ may be determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001), and references therein. Three Polymer Laboratories PLgel 10 mm Mixed-B LS columns are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the is desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers, and 0.1 otherwise, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and =690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$, which is also referred to simply as g' is defined as:

$$g'_{vis} = \frac{[\eta]_{avg}}{k M_v^\alpha}$$

where, for purpose of this invention and claims thereto, α=0.695 and k=0.000579 for linear ethylene polymers, α=0.705 and k=0.000262 for linear propylene polymers, and α=0.695 and k=0.000181 for linear butene polymers. $M_v$ is the viscosity-average molecular weight based on molecular weights determined by LS analysis.

The term "g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls}=K_s M^{0.58}$ where $K_s$ is the power law coefficient (0.023 for linear polyethylene, 0.0171 for linear polypropylene, and 0.0145 for linear polybutene), and M is the molecular weight as described above, $Rg_{pm}=K_T M^{\alpha s}$. $\alpha_s$ is the size coefficient for the polymacromer, $K_T$ is the power law coefficient for the polymacromer. See Macromolecules, 2001, 34, 6812-6820, for guidance on selecting a linear standard having the molecular weight and comonomer content, and determining K coefficients and a exponents.

Process

Disclosed herein are methods for reliably operating a polyolefin polymerization process when using high-activity catalyst systems, such as a catalyst system utilizing a Generation IV or subsequent (e.g., Generation IV, V, VI, and so on) Ziegler-Natta catalyst or is other highly active catalyst systems, including metallocene catalyst systems. It has been found that suitable catalyst activity can be achieved with significantly limited or no catalyst and activator pre-contacting time, thus reducing or avoiding many of the complications associated with catalyst and activator pre-contacting. Various catalyst and activator injection schemes may be employed to eliminate or limit the pre-contacting time, and several general schemes are described in greater detail herein.

In any embodiment, the process can be used in the polymerization of propylene polymers, including propylene-based homopolymers and copolymers. For example, the process can be used in the polymerization of propylene copolymers where a majority of the mer units are derived from propylene and other mer units are derived from ethylene or a $C_4$-$C_{10}$ olefin. It is contemplated, however, that the process can be used for any polyolefin polymerization process in which catalyzed polymerization is performed with similarly highly-active catalyst systems.

In any embodiment, the inventive method may include introducing a catalyst and an activator into a reactor wherein the catalyst and the activator are introduced into the reactor with less than 10 seconds or no pre-contacting time. The reactor may be a vessel in which one or more olefin monomers are present. For example, the reactor may be a pre-polymerization reactor or a primary polymerization reactor. In any embodiment, the reactor may be a slurry loop reactor.

In any embodiment, the method may further include introducing an external donor system into the reactor. The external donor may be a compound that influences the stereoregularity of a resulting polymer. Various non-limiting examples of external donors that may be employed in the process are described subsequently herein. In any embodiment, the catalyst may be pre-contacted with the external donor system before being introduced into the reactor. For example, the catalyst may be pre-contacted with the external donor system for a period of time of less than 10 seconds, or less than 5 seconds. Alternatively, in other embodiments, the catalyst and external donor system may be introduced separately into the reactor. In any embodiment, the activator and electron donor system may be mixed before being brought into contact with the catalyst.

The catalyst and catalyst activator may be introduced into the process at various locations to avoid or limit pre-contacting time between the catalyst and activator. For example, in any embodiment, the catalyst and the catalyst activator may be separately introduced into a catalyst feed conduit upstream of an injector feeding the catalyst and the catalyst activator into the reactor. In an alternate embodiment, the catalyst and the catalyst activator may be separately introduced into the reactor. In an exemplary embodiment, the catalyst may be injected into a first monomer-containing stream and the catalyst activator is injected into a second monomer-containing stream.

In any embodiment, the catalyst may be injected in a monomer-containing stream upstream of an injection point where the catalyst activator is injected. In any embodiment, the catalyst activator and external electron donor may be premixed and optionally cooled before being injected into the monomer-containing stream. In any embodiment, the catalyst may be injected into a first monomer stream and the catalyst activator and external electron donor may be injected into a second monomer stream. The introduction of catalyst system components into the reactor may be any injector known in the art to effectively inject a catalyst solid slurry into a monomer-containing system.

In any embodiment, pre-contacting time may be controlled by independently adjusting the flow rate of any of the catalyst system components. For example, pre-contacting time may be controlled by independently adjusting the flow rate of the catalyst activator. Pre-contacting time may also be controlled by injecting and/or adjusting the flow rate of an inert component. For example, the inert component may be a $C_3$-$C_{50}$ alkane. In any embodiment, the inert may be selected from the group consisting of: propane, butane, pentane, hexane, mineral oil, and combinations thereof. In an exemplary embodiment, the inert component may comprise a mineral oil and, optionally, a petroleum grease.

The methods for limiting or avoiding catalyst and activator pre-contacting described herein may be advantageously employed with a highly active catalyst system used in a polymerization process to produce a polypropylene resin comprising at least 50 mol % propylene, an MWD greater than about 5 and a melt strength of at least 20 cN determined using an extensional rheometer at 190° C., the catalyst system comprising: a Ziegler-Natta catalyst comprising a non-aromatic internal electron donor; and first and second external electron donors comprising different organosilicon compounds. In any embodiment, the first external electron donor may have the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3_n Si(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

In any embodiment, the non-aromatic internal electron donor may comprise an aliphatic amine, amide, ester, ether, ketone, nitrile, phosphine, phosphoramide, thioether, thioester, aldehyde, alcoholate, carboxylic acid, or a combination thereof, or a $C_1$-$C_{20}$ diester of a substituted or unsubstituted $C_2$-$C_{10}$ dicarboxylic acid, or a succinate according to the formula:

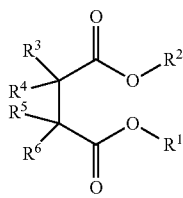

wherein $R^1$ and $R^2$ are, independently, $C_1$-$C_{20}$ linear or branched alkyl, alkenyl, or cycloalkyl hydrocarbyl radicals; $R^3$ to $R^6$ are, independently, hydrogen, halogen, or $C_1$-$C_{20}$ linear or branched alkyl, alkenyl, or cycloalkyl hydrocarbyl radicals, wherein the $R^3$ to $R^6$ radicals are not joined together, or wherein at least two of the $R^3$ to $R^6$ radicals are joined to form a cyclic divalent radical, or a combination thereof.

In any embodiment, the polymerization process according to the instant disclosure may include contacting propylene with any embodiment herein described of the catalyst system under polymerization conditions. In any embodiment, the polymerization process may include a preliminary polymerization step. In any embodiment, the preliminary polymerization may include utilizing the Ziegler-Natta catalyst system comprising the non-aromatic internal electron donor in combination with at least a portion of the organoaluminum co-catalyst wherein at least a portion of the external electron donors are present wherein the catalyst system is utilized in a higher concentration than utilized in the subsequent "main" polymerization process.

In any embodiment, the concentration of the catalyst system in the preliminary polymerization, based on the moles of titanium present, may be about 0.01 to 200 millimoles, or about 0.05 to 100 millimoles, calculated as a titanium atom, per liter of an inert hydrocarbon medium. In any embodiment, the organoaluminum co-catalyst may be present in an amount sufficient to produce about 0.1 to 500 g, or 0.3 to 300 g, of a polymer per gram of the titanium catalyst present, and may be present at about 0.1 to 100 moles, or about 0.5 to 50 moles, per mole of the titanium atom present in the catalyst component.

In any embodiment, the preliminary polymerization may be carried out under mild conditions in an inert hydrocarbon medium in which an olefin and the catalyst components are present. Examples of the inert hydrocarbon medium used include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures thereof. The olefin used in the preliminary polymerization may be the same as an olefin to be used in the main polymerization.

In any embodiment, the reaction temperature for the preliminary polymerization may be a point at which the resulting preliminary polymerization does not dissolve substantially in the inert hydrocarbon medium, which may be about −20 to +100° C., or about −20 to +80° C., or from 0 to 40° C.

In any embodiment, during the preliminary polymerization, a molecular weight controlling agent such as hydrogen may be used. The molecular weight controlling agent may desirably be used in such an amount that the polymer obtained by preliminary polymerization has properties consistent with the intended product. In any embodiment, the preliminary polymerization may be carried out so that about 0.1 to 1000 g, or about 0.3 to 300 g, of a polymer forms per gram of the titanium catalyst.

The methods for limiting or avoiding catalyst and activator pre-contacting described herein may be advantageously employed with a highly active catalyst system used in a polymerization process for producing a polypropylene resin, wherein the process comprises contacting propylene monomers at a temperature and a pressure in the presence of catalyst system to produce a propylene resin comprising at least 50 mol % propylene, and wherein the catalyst system comprises:

a Ziegler-Natta catalyst comprising a non-aromatic internal electron donor;

a first external electron donor having the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and a second external electron donor having the formula $R^3{}_nSi(OR^4)_{4-n}$, wherein each $R^3$ and $R^4$ are independently a hydrocarbyl radical comprising from 1 to 10 carbon atoms, n is 1, 2, or 3; and the second external electron donor is different than the first external electron donor.

In any embodiment, the propylene polymer resin may have a melt strength of at least 20 cN determined using an extensional rheometer at 190° C.

In any embodiment, the olefin may comprise or consist essentially of propylene. In any embodiment, the olefin may comprise from 0 to 49% of an alpha olefin other than propylene, as defined herein. In any embodiment, the alpha olefin may include ethylene, 1-butene, 4-methyl-1-pentene, 1-octene, or a combination thereof. In any embodiment, the olefin may comprise at least 50 wt % propylene, or at least 75 wt %, or at least 99 wt % propylene.

In any embodiment, the polymerization of the olefin may be carried out in the gaseous phase, the liquid phase, bulk phase, slurry phase, or any combination thereof.

In any embodiment, polymerization may be carried out by slurry polymerization wherein the inert hydrocarbon may be used as a reaction solvent, or an olefin liquid under the reaction conditions may be used as the solvent.

In any embodiment, the titanium catalyst may be present in the reactor at about 0.005 to 0.5 millimole, preferably about 0.01 to 0.5 millimole, based on Ti moles per liter of the reaction zone. In any embodiment, the organoaluminum co-catalyst may be present in an amount sufficient to produce about 1 to 2,000 moles, or about 5 to 500 moles of aluminum per mole of the titanium atom in the catalyst system. In any embodiment, the internal electron donor may be present at about 0.2 to about 5.0, or about 0.5 to about 2.0 per mole of Ti.

In any embodiment, the total amount of the external electron donors may be about 0.001 to 50 moles, or about 0.01 to 20 moles, or about 0.05 to 10 mole Si per mole of Ti present.

In any embodiment, the first external electron donor may be present in the catalyst system at from about 2.5 to 50 mol %, or about 2.5 to 10 mol % of the total amount of external electron donor present.

In any embodiment, the polymerization process may include contacting the titanium catalyst component, the organoaluminum co-catalyst, and the two external electron donors with each other at the time of the main polymerization, before the main polymerization, for example, at the time of the preliminary polymerization, or a combination thereof. In contacting them before the main polymerization, any two or more of these components may be freely selected and contacted. In any embodiment, two or more of the components may be contacted individually or partly and then contacted with each other in total to produce the catalyst system.

In any embodiment, the catalyst system components may be contacted with each other before the polymerization in an inert gaseous atmosphere, the individual catalyst components may be contacted with each other in an olefin atmosphere, or any combination thereof.

In any embodiment, hydrogen may be used during the polymerization to control the molecular weight and other properties of the resulting polymer.

In any embodiment, polymerization conditions may include a polymerization temperature of about 20 to 200° C., or about 50 to 180° C., and a pressure from atmospheric pressure to about 100 kg/cm², or from about 2 to 50 kg/cm². The polymerization process according to the instant disclosure may be carried out batchwise, semicontinuously, or continuously. The polymerization may be carried out in two or more stages, using two or more reactors under different reaction conditions, utilizing different internal electron donors, different external electron donors, and/or different catalyst systems.

In any embodiment, the polypropylene resin according to the instant disclosure may be produced in a bulk continuous reactor. A catalyst system comprising a magnesium chloride supported titanium catalyst according to one or more embodiments of the instant disclosure is utilized. Catalyst preparation may be carried out continuously in situ by contacting the catalyst solids, triethylaluminum, and the external electron donor system under conditions known in the art to yield active, stereospecific catalyst for polymerization of propylene. The activated catalyst may then be continuously fed into a prepolymerization reactor where it is continuously polymerized in propylene to a productivity of approximately 100 to 400 g-polymer/g-cat. The prepolymerized catalyst may then be continuously fed into a bulk slurry reactor, and polymerization continued at 70° C. to 80° C., for a residence time of about 90 minutes. The reaction slurry (homopolymer granules in bulk propylene) may then be removed from the reactor and the polymer granules continuously separated from the liquid propylene. The polymer granules may then be separated from the unreacted monomer to produce a granular product for compounding and/or mechanical properties. In any embodiment, hydrogen may be used in the reactor to control the melt flow rate of the polypropylene resin.

In the case of impact copolymer resin production, the granules from the bulk reactor, after removing the monomer, may be fed directly into a Gas Phase Reactor (GPR) where polymerization is continued under conditions known in the art to produce ethylene-propylene bipolymer within the pores of the polymer granules. The final product, referred to in the art as an "impact copolymer," may be continuously withdrawn from the gas phase reactor and separated from unreacted monomer to produce a granular product for compounding and further processing. The molecular weight of the ethylene-propylene rubber or more appropriately, Intrinsic Viscosity (IV) of the rubber phase may be controlled by the concentration of hydrogen in the GPR.

In any embodiment, the granules from the reactor may be stabilized with at least 0.01 wt % of an additive, e.g., 0.15 wt % Irganox™ 1010, 0.05 wt % Ultranox™ 626A, and/or with 0.075 wt % sodium benzoate (fine form) and then pelletized, e.g., on a 30 mm Werner & Pfleiderer twin screw extruder. The pellets may then be injection molded, and/or subjected to further processing.

Catalyst Systems

The methods for reliably operating a polyolefin polymerization process described herein are particularly well-suited for catalyst systems having a high activity. It has been found that suitable catalyst activity can be achieved with significantly limited or no catalyst and activator pre-contacting time, thus reducing or avoiding many of the complications associated with catalyst and activator pre-contacting.

More particularly, the methods may be advantageously employed with catalyst systems having a standard adjusted catalyst activity of greater than 10 gPgcat$^{-1}$hr$^{-1}$, particularly greater than 40 gPgcat$^{-1}$hr$^{-1}$, and even more particularly catalyst systems having a standard adjusted catalyst activity of greater than 70 gPgcat$^{-1}$hr$^{-1}$, including catalyst systems having a catalyst activity of greater than 160 gPgcat$^{-1}$hr$^{-1}$.

Of particular interest are highly active Ziegler-Natta catalyst systems, particularly catalysts comprising a Ti polymerization site and internal electronic donor(s), such as in Generation IV or later Ziegler-Natta catalysts (e.g., Generation IV, V and subsequent catalyst systems). Subsequent generation Ziegler-Natta catalysts generally have higher activity than previous generation Ziegler-Natta catalysts.

In any embodiment, Ziegler-Natta catalysts suitable for use herein include solid titanium supported catalyst systems described in U.S. Pat. Nos. 4,990,479 and 5,159,021, and PCT Publication No. WO 00/63261, and others. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium hydrocarbon composition with a titanium halide and with a diester of an aromatic dicarboxylic acid; and (3) contacting the resulting functionalized dialkoxy magnesium-hydrocarbon composition of step (2) with additional titanium halide.

In any embodiment, the catalyst system may be a solid titanium catalyst component comprising magnesium, titanium, halogen, a non-aromatic internal electron donor, and two or more external electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula:

$$Ti(OR_n)X_{4-n}$$

wherein R is a hydrocarbyl radical, X is a halogen atom, and n is from 0 to 4.

In any embodiment, suitable titanium compounds for use herein include: titanium tetra-halides such as TiCl$_4$, TiBr$_4$, and/or TiI$_4$; alkoxy titanium trihalides including Ti(OCH$_3$)Cl$_3$, Ti(OC$_2$H$_5$)Cl$_3$, Ti(O n-C$_4$H$_9$)Cl$_3$, Ti(OC$_2$H$_5$)Br$_3$, and/or Ti(O iso-C$_4$H$_9$)Br$_3$; dialkoxytitanium dihalides including Ti(OCH$_3$)$_2$Cl$_2$, Ti(OC$_2$H$_5$)$_2$Cl$_2$, Ti(O n-C$_4$H$_9$)$_2$Cl$_2$, and/or Ti(OC$_2$H$_5$)$_2$Br$_2$; trialkoxytitanium monohalides including Ti(OCH$_3$)$_3$Cl, Ti(OC$_2$H$_5$)$_3$Cl, Ti(O n-C$_4$H$_9$)$_3$Cl, and/or Ti(OC$_2$H$_5$)$_3$Br; and/or tetraalkoxy titaniums including Ti(OCH$_3$)$_4$, Ti(OC$_2$H$_5$)$_4$, and/or Ti(O n-C$_4$H$_9$)$_4$.

In any embodiment, the halogen-containing titanium compound may be a titanium tetrahalide, or titanium tetrachloride. The titanium compounds may be used singly or in combination with each other. The titanium compound may be diluted with a hydrocarbon compound or a halogenated hydrocarbon compound.

In any embodiment, the magnesium compound to be used in the preparation of the solid titanium catalyst component may include a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds may be used singly or they may form complexes with the organo-aluminum co-catalyst as described herein. These magnesium compounds may be a liquid or a solid.

Suitable examples of the magnesium compounds having no reducibility include magnesium halides such as magnesium chloride, magnesium bromide, magnesium iodide, and magnesium fluoride; alkoxy magnesium halides, such as magnesium methoxy chloride, magnesium ethoxy chloride, magnesium isopropoxy chloride, magnesium phenoxy chloride, and magnesium methylphenoxy chloride; alkoxy magnesiums, such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and/or magnesium carboxylates, such as magnesium laurate and magnesium stearate.

In any embodiment, non-reducible magnesium compounds may be compounds derived from the magnesium compounds having reducibility, or may be compounds derived at the time of preparing the catalyst component. The magnesium compounds having no reducibility may be derived from the compounds having reducibility by, for example, contacting the magnesium compounds having reducibility with polysiloxane compounds, halogen-containing silane compounds, halogen-containing aluminum compounds, esters, alcohols, and the like.

In any embodiment, the magnesium compounds having reducibility and/or the magnesium compounds having no reducibility may be complexes of the above magnesium compounds with other metals, or mixtures thereof with other metal compounds. They may also be mixtures of two or more types of the above compounds. In any embodiment, halogen-containing magnesium compounds, including magnesium chloride, alkoxy magnesium chlorides and aryloxy magnesium chlorides may be used.

In any embodiment, a suitable solid catalyst component comprising a non-aromatic internal electron donor may be a catalyst solid sold by Lyondell-Basell Inc. under the trade name of Avant™ ZN-168. Such a catalyst is used to exemplify the invention, other titanium supported catalyst systems are contemplated. Other catalyst use mechanisms are contemplated. Including, but not limited to, batch prepolymerization, in situ prepolymerization and other such mechanisms.

Activators

In any embodiment, supported Ziegler-Natta catalysts may be used in combination with an activator, also referred to herein as a co-catalyst. In any embodiment, compounds containing at least one aluminum-carbon bond in the molecule may be utilized as the co-catalysts, also referred to herein as an organoaluminum co-catalyst. Suitable organoaluminum compounds include organoaluminum compounds of the general formula:

wherein $R^1$ and $R^2$ are identical or different, and each represents a hydrocarbyl radical containing from 1 to 15 carbon atoms, or 1 to 4 carbon atoms; X represents a halogen atom; and $0<m\leq3$, $0\leq n<3$, $0\leq p<3$, and $0\leq q<3$, and $m+n+p+q=3$.

Other suitable organoaluminum compounds include complex alkylated compounds of metals of Group I and aluminum represented by the general formula:

wherein $M^1$ is Li, Na, or K and $R^1$ is as defined above.

Suitable organoaluminum compounds include compounds represented by the following general formulae:

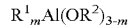

wherein $R^1$ and $R^2$ are as defined above, and m is preferably $1.5\leq m\leq3$;

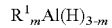

wherein $R^1$ is as defined above, X is halogen, and m is $0<m<3$, or $2\leq m<3$; and/or

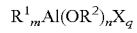

wherein $R^1$ and $R^2$ are as defined above, X is halogen, $0<m\leq3$, $0\leq n<3$, $0\leq q<3$, and $m+n+q=3$.

Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl aluminum ethoxide and dibutyl aluminum ethoxide; alkyl aluminum sesquialkoxides such as ethyl aluminum sesquiethoxide and butyl aluminum sesqui-butoxide; partially alkoxylated alkyl aluminums having an average composition represented by the general formula $R^1_{2.5}Al(OR^2)_{0.5}$; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride, and ethyl aluminum ethoxybromide.

In any embodiment, the organoaluminum compound may comprise two or more aluminum atoms bonded through an oxygen or nitrogen atom. Examples include $(C_2H_5)_2AlOAl(C_2H_5)_2$, $(C_4H_9)_2AlOAl(C_4H_9)_2$, and/or methylaluminoxane (MAO). Other suitable examples include $LiAl(C_2H_5)_4$ and $LiAl(C_2H_{15})_4$. In any embodiment, the trialkyl aluminums and alkyl-aluminums resulting from bonding of at least two aluminum compounds may be used.

In any embodiment, the co-catalyst may be an organoaluminum compound that is halogen free. Suitable halogen free organoaluminum compounds are, in particular, branched unsubstituted alkylaluminum compounds of the formula $AlR_3$, where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art including U.S. Pat. No. 4,990,477, which is incorporated herein by reference for purposes of U.S. patent practice. In any embodiment, the organoaluminum Ziegler-Natta co-catalyst may be trimethyl aluminum, triethylaluminum (TEAL), or a combination thereof.

Internal Electron Donors

Internal electron donors suitable for use herein generally may be used in two ways in the formation of Ziegler-Natta catalysts and catalyst systems. In any embodiment, an internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids. In any embodiment, the internal donor may be a phthalate. In any embodiment, the internal donor may be non-aromatic. In any embodiment, the non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof.

In any embodiment, the solid titanium catalyst component may be prepared using a non-aromatic internal electron donor. Examples of suitable non-aromatic internal electron donors include oxygen-containing electron donors such as alcohols, ketones, aldehydes, carboxylic acids, esters of organic or inorganic oxides, ethers, acid amides and acid anhydrides; nitrogen-containing electron donors such as ammonia, amines, nitriles, and/or isocyanates. Suitable examples include alcohols having 1 to 18 carbon atoms such as methanol, ethanol, propanol, pentanol, hexanol, octanol, 2-ethylhexanol, dodecanol, octadecyl alcohol, and the like; ketones having 3 to 15 carbon atoms such as acetone, methyl ethyl ketone, methyl isobutyl ketone, and the like; aldehydes having 2 to 15 carbon atoms such as acetaldehyde, propionaldehyde, octylaldehyde, and the like; organic acid esters having 2 to 30 carbon atoms including the esters desired to be included in the titanium catalyst component, such as methyl formate, ethyl formate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethylcyclo-hexanecarboxylate, diethyl 1,2-cyclohexanedicarboxylate, di(2-ethylhexyl) 1,2-cyclohexanedicarboxylate, gamma-butyrolactone, delta-valerolactone, and/or ethylene carbonate; inorganic acid esters such as ethyl silicate and butyl silicate; acid halides having 2 to 15 carbon atoms such as acetyl chloride and the like; ethers having 2 to 20 carbon atoms, such as methyl ether, ethyl ether, isopropyl ether, butyl ether, amyl ether, tetrahydrofuran and the like; acid amides such as acetamide, and the like; acid anhydrides such as acetic anhydride, and the like; amines such as methylamine, ethyl-amine, triethylamine, tributylamine, tetramethyl-ethylenediamine, and the like; and nitriles such as acetonitrile, trinitrile, and the like.

In any embodiment, the non-aromatic internal electron donor may comprise a $C_1$-$C_{20}$ diester of a substituted or unsubstituted $C_2$-$C_{10}$ dicarboxylic acid. In any embodiment, the non-aromatic internal electron donor may be a succinate according to formula (I):

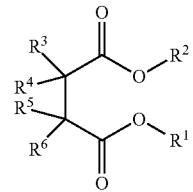

wherein $R^1$ and $R^2$ are independently $C_1$-$C_{20}$ linear or branched alkyl, alkenyl, or cycloalkyl hydrocarbyl radicals; $R^3$ to $R^6$ are independently, hydrogen, halogen, or $C_1$-$C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof.

In any embodiment, $R^3$ to $R^5$ of formula I may be hydrogen and $R^6$ may be a radical selected from the group consistent of a primary branched, secondary or tertiary alkyl, or cycloalkyl radical having from 3 to 20 carbon atoms.

In any embodiment, the internal donor may be a mono-substituted non-aromatic succinate compound. Suitable examples include diethyl secbutylsuccinate, diethylhexylsuccinate, diethyl cyclopropylsuccinate, diethyl trimethylsilylsuccinate, diethyl methoxysuccinate, diethyl cyclohexylsuccinate, diethyl(cyclohexylmethyl) succinate, diethyl t-butylsuccinate, diethyl isobutylsuccinate, diethyl isopropylsuccinate, diethyl neopentylsuccinate, diethyl isopentylsuccinate, diethyl (1,1,1-trifluoro-2-propyl) succinate, diisobutyl sec-butylsuccinate, diisobutylhexylsuccinate, diisobutyl cyclopropylsuccinate, diisobutyl trimethylsilylsuccinate, diisobutyl methoxysuccinate, diisobutyl cyclohexylsuccinate, diisobutyl(cyclohexylmethyl) succinate, diisobutyl t-butylsuccinate, diisobutyl isobutylsuccinate, diisobutyl isopropylsuccinate, diisobutyl neopentylsuccinate, diisobutyl isopentylsuccinate, diisobutyl (1,1,1-trifluoro-2-propyl) succinate, dineopentyl sec-butylsuccinate, dineopentyl hexylsuccinate, dineopentyl cyclopropylsuccinate, dineopentyl trimethylsilylsuccinate, dineopentyl methoxysuccinate, dineopentyl cyclohexylsuccinate, dineopentyl(cyclohexylmethyl) succinate, dineopentyl t-butylsuccinate, dineopentyl isobutylsuccinate, dineopentyl isopropylsuccinate, dineopentyl neopentylsuccinate, dineopentyl isopentylsuccinate, and/or dineopentyl (1,1,1-trifluoro-2propyl) succinate.

In any embodiment, the internal electron donor having a structure consistent with formula (I) may comprise at least two radicals from $R^3$ to $R^6$, which are different from hydrogen and are selected from $C_1$-$C_{20}$ linear or branched alkyl, alkenyl, and/or cycloalkyl hydrocarbyl groups, which may contain heteroatoms. In any embodiment, two radicals different from hydrogen may be linked to the same carbon atom. Suitable examples include 2,2-disubstituted succinates including diethyl 2,2-dimethylsuccinate, diethyl 2-ethyl-2-methylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl-2-methylsuccinate, diethyl 2,2-diisopropyl diethyl 2 isobutyl-2-ethylsuccinate, diethyl 2-(1,1,1-trifluoro-2-propyl)-2-methylsuccinate, diethyl 2 isopentyl-2-isobutylsuccinate, diisobutyl 2,2-dimethylsuccinate, diisobutyl 2-ethyl-2-methylsuccinate, diisobutyl 2-(cyclohexylmethyl)-2-isobutylsuccinate, diisobutyl 2-cyclopentyl-2-n-propylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-isobutyl-2-ethylsuccinate, diisobutyl 2-(1,1,1-trifluoro-2-propyl)-2-methylsuccinate, diisobutyl 2-isopentyl-2-isobutylsuccinate, diisobutyl 2,2-diisopropylsuccinate, dineopentyl 2,2-dimethylsuccinate, dineopentyl 2-ethyl-2-methylsuccinate, dineopentyl 2-(cyclohexylmethyl)-2-isobutylsuccinate, dineopentyl 2-cyclopentyl-2-n-propylsuccinate, dineopentyl 2,2-diisobutylsuccinate, dineopentyl 2-cyclohexyl-2-ethylsuccinate, dineopentyl 2-isopropyl-2-methylsuccinate, dineopentyl 2-isobutyl-2-ethylsuccinate, dineopentyl 2-(1,1,1-trifluoro-2-propyl)-2-methylsuccinate, dineopentyl 2,2-diisopropylsuccinate, and/or dineopentyl 2-isopentyl-2 isobutylsuccinate.

In any embodiment, at least two radicals different from hydrogen may be linked to different carbon atoms between $R^3$ and $R^6$. Examples include $R^3$ and $R^5$ or $R^4$ and $R^6$. Suitable non-aromatic succinate compounds include: diethyl 2,3-bis-(trimethylsilyl) succinate, diethyl 2,2-secbutyl-3-methylsuccinate, diethyl 2-(3,3,3-trifluoropropyl)-3-methylsuccinate, diethyl 2,3-bis(2-ethylbutyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-diisopropylsuccinate, diethyl 2,3-bis-(cyclohexylmethyl) succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2-isopropyl-3-isobutylsuccinate, diethyl 2-t-butyl-3isopropylsuccinate, diethyl 2-isopropyl-3-cyclohexylsuccinate, diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3-bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl)succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-diisopropylsuccinate, diisobutyl 2,3-bis-(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3diisopentylsuccinate, diisobutyl 2,3-(1,1,1-trifluoro-2-propyl) succinate, diisobutyl 2,3-n-propylsuccinate, diisobutyl 2-isopropyl-3-ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3 (cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3-bis-(2-ethylbutyl)succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-diisopropylsuccinate, dineopentyl 2,3-bis (cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1,1,1-trifluoro-2propyl)succinate, dineopentyl 2,3-n-propylsuccinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3 cyclohexylsuccinate, dineopentyl 2-n-propyl-3-(cyclohexylmethyl)succinate, dineopentyl 2 cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, and/or dineopentyl 2,3-diethyl 2,3-diisopropylsuccinate.

In any embodiment, the compounds according to formula (I) may include two or four of the radicals $R^3$ to $R^6$ joined to the same carbon atom which are linked together to form a cyclic multivalent radical. Examples of suitable compounds include 1-(ethoxycarbonyl)-1-(ethoxyacetyl)-2,6-dimethylcyclohexane, 1-(ethoxycarbonyl)-1-(ethoxyacetyl)-2,5-dimethyl-cyclopentane, 1-(ethoxycarbonyl)-1-(ethoxyacetylmethyl)-2-methylcyclohexane, and/or 1-(ethoxycarbonyl)-1-(ethoxy(cyclohexyl)acetyl)cyclohexane.

For purposes herein, all the above mentioned compounds can be used either in the form of pure stereoisomers or in the form of mixtures of enantiomers, or a mixture of diastereoisomers and enantiomers. When a pure isomer is to be used, it may be isolated using the common techniques known in the art. In particular, some of the succinates of the present invention can be used as a pure rac or meso forms, or as mixtures thereof, respectively.

In any embodiment, the internal electron donor compound may be selected from the group consisting of diethyl 2,3-diisopropylsuccinate, diisobutyl 2,3-diisopropylsuccinate, di-n-butyl 2,3-diisopropylsuccinate, diethyl 2,3-dicyclohexyl-2-methylsuccinate, diisobutyl 2,3-dicyclohexyl-2-methylsuccinate, diisobutyl 2,2-dimethylsuccinate, diethyl 2,2-dimethylsuccinate, diethyl 2-ethyl-2-methylsuccinate, diisobutyl 2-ethyl-2-methylsuccinate, diethyl 2-(cyclohexylmethyl)-3-ethyl-3-methylsuccinate, diisobutyl 2-(cyclohexylmethyl)-3-ethyl-3-methylsuccinate, and combinations thereof.

External Electron Donors

In any embodiment, in conjunction with an internal donor, two or more external electron donors may also be used in combination with a catalyst. External electron donors include, but are not limited to, organic silicon compounds, e.g., tetraethoxysilane (TEOS), methylcyclohexyldimethoxysilane (MCMS), propyltriethoxysilane (PTES) and dicyclopentydimethoxysilane (DCPMS). Internal and external-type electron donors are described, for example, in U.S. Pat. No. 4,535,068, which is incorporated herein by reference for purposes of U.S. patent practice. The use of organic silicon compounds as external electron donors is described, for example, in U.S. Pat. Nos. 4,218,339, 4,395,360, 4,328,122 and 4,473,660, all of which are incorporated herein by reference for purposes of U.S. patent practice. The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given external electron donor are directly and inversely related. The DCPMS donor has a substantially lower hydrogen response than the PTES donor, but produces a significantly higher level of stereoregularity than PTES.

In any embodiment, the two external electron donors A and B, also referred to herein as the first external electron donor and the second external electron donor, may be selected such that the melt flow rate MFR (A) of homopolypropylene obtained by homopolymerizing propylene by using the first external electron donor (A) in combination with the solid titanium catalyst component and the organoaluminum compound catalyst component and the MFR (B) of homopolypropylene obtained by homopolymerizing propylene by using the second external electron donor (B) under the same conditions as in the case of using the external electron donor (A) have the following relation:

$$1.2 \leq \log [\text{MFR}(B)/\text{MFR}(A)] \leq 1.4.$$

The external electron donors to be used in the preparation of the electron donor catalyst component may be those electron donors which are used in preparing the solid titanium catalyst component. In any embodiment, each of the external electron donors (A) and (B) may comprise organic silicon compounds.

In any embodiment, one or more of the external electron donors may comprise an organic silicon compound of formula:

$$R^3{}_n Si(OR^4)_{4-n}$$

wherein $R^3$ and $R^4$ independently represent a hydrocarbyl radical and $0 < n < 4$.

Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxy-silane, dicyclohexyldiethoxysilane, cyclohexylmethyl-dimethoxysilane, cyclohexylmethyldiethoxysilane, ethyltrimethoxysilane, ethyltriethoxysilane, vinyl-trimethoxysilane, methyltrimethoxysilane, n-propyltriethoxysilane, decyltrimethoxysilane, decyltriethoxy-silane, phenyltrimethoxysilane, [gamma]-chloropropyltrimethoxysilane, methyltriethoxysilane, ethyltriethoxy-silane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxy-silane, ethyl silicate, butyl silicate, trimethyl-phenoxysilane, methylallyloxysilane, vinyltris(beta-methoxyethoxysilane), vinyltriacetoxysilane, and/or dimethyltetraethoxydisiloxane.

In any embodiment, one of the two or more organic silicon compounds may comprise the formula:

$$R^1{}_2 Si(OR^2)_2$$

wherein $R^1$ represents a hydrocarbyl radical in which the carbon adjacent to Si is secondary or tertiary. Suitable examples include substituted and unsubstituted alkyl groups such as isopropyl, sec-butyl, t-butyl and t-amyl groups, cyclo-alkyl groups such as cyclopentyl and cyclohexyl groups, cycloalkenyl groups such as a cyclopentenyl group, and aryl groups such as phenyl and tolyl groups. In any embodiment, $R^2$ may represent a hydrocarbyl radical, or a hydrocarbyl radical having 1 to 5 carbon atoms, or a hydrocarbyl radical having 1 or 2 carbon atoms.

Examples of suitable organic silicon compound include diisopropyldimethoxysilane, diisopropyldiethoxysilane, di-sec-butyldimethoxysilane, di-t-butyldimethoxysilane, di-t-amyldimethoxysilane, dicyclopentyldimethoxysilane, dicyclohexyldimethoxy-silane, diphenyldimethoxysilane, bis-o-tolyldimethoxy-silane, bis-m-tolyldimethoxysilane, bis-p-tolyldi-methoxysilane, and/or bis-ethylphenyldimethoxysilane.

In any embodiment, the organic silicon compound may be represented by the following general formula:

$$R^1{}_n Si(OR^2)_{4-n}$$

wherein n is 2, $R^1$ each represents a hydrocarbyl radical, and at least one of the two hydrocarbyl radicals is a hydrocarbon group in which the carbon adjacent to Si is a primary carbon. Examples of suitable hydrocarbon groups include alkyl groups such as ethyl, n-propyl and n-butyl groups, aralkyl groups such as cumyl and benzyl groups, and alkenyl groups such as a vinyl group, and the like.

In any embodiment, $R^2$ may represent a hydrocarbyl radical preferably having 1 to 5 carbon atoms, or from 1 to 2 carbon atoms. Suitable examples of the organic silicon compounds in which n is 2 include diethyldimethoxysilane, dipropyldimethoxysilane, di-n-butyldimethoxysilane, dibenzyldimethoxysilane and/or divinyldimethoxysilane.

Examples of suitable compounds when $0 \leq n < 2$ or $2 < n < 4$ include $R^1$ being an alkyl, cycloalkyl, alkenyl, aryl or aralkyl group and $R^2$ represents a hydrocarbyl radical having 1 to 5 carbon atoms, or 1 to 2 carbon atoms.

Suitable examples of the organic silicon compounds in which $0 \leq n < 2$ or $2 < n < 4$ include trimethylmethoxysilane, trimethylethoxysilane, methyl-phenyldimethoxysilane, methyltrimethoxysilane, t-butyl-methyldimethoxysilane, t-butylmethyldiethoxysilane, t-amylmethyldimethoxysilane, phenylmethyldimethoxysilane, cyclohexylmethyldimethoxysilane, cyclohexylmethyldi-ethoxysilane, ethyltrimethoxysilane, ethyltriethoxy-silane, vinyltriethoxysilane, methyltrimethoxysilane, methyltriethoxysilane, propyltrimethoxysilane, decyl-trimethoxysilane, decyltriethoxysilane, phenyltrimethoxysilane, propyltriethoxysilane, butyltriethoxy-silane, phenyltriethoxysilane, vinyltrimethoxysilane, vinyltributoxysilane, cyclohexyltrimethoxysilane, 2-norbornanetrimethoxysilane, and/or 2-norbornanetriethoxy-silane.

In any embodiment, the external electron donors include methyltrimethoxysilane, ethyltrimethoxysilane, ethyltriethoxysilane, vinyltriethoxysilane, propyltrimethoxysilane, decyl-trimethoxysilane, decyltriethoxysilane, propyltriethoxysilane, butyltriethoxysilane, phenyltriethoxy-silane, vinyltrimethoxysilane, vinyltributoxysilane and/or cyclohexyltrimethoxysilane.

In any embodiment, the above disclosed organic silicon compounds may be used such that a compound capable of being changed into such an organic silicon compound is added at the time of polymerizing or preliminarily polymerizing an olefin, and the organic silicon compound may be formed in-situ during the polymerization or the preliminary polymerization of the olefin.

In any embodiment, a first external electron donor may have the formula $R^1{}_2 Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and a second external electron donor having the formula $R^3{}_n Si(OR^4)_{4-n}$, wherein each $R^3$ and $R^4$ are independently a hydrocarbyl radical comprising from 1 to 10 carbon atoms, and n is 1, 2, or 3; and the second external electron donor is different than the first external electron donor.

In any embodiment, the first external electron donor and the second external electron donor may be selected from the group consisting of tetraethoxysilane, methylcyclohexyldimethoxysilane, propyltriethoxysilane, dicyclopentyldimethoxysilane, and combinations thereof. In any embodiment, the Ziegler-Natta catalyst system may comprise about 2.5 mol % to less than 50 mo % of the first external electron donor and greater than 50 mol % of a second external electron donor based on total mol % of external electron donors. In any embodiment, the first electron donor may comprise, consist of, or consist essentially of dicyclopentyldimethoxysilane (DCPMS) and the second external electron donor may comprise, consist of, or consist essentially of propyltriethoxysilane (PTES).

In any embodiment, a relationship between the first external electron donor and the second external electron donor may be defined by the equation:

$$1.2 \leq \log[MFR(B)/MFR(A)] \leq 1.4$$

wherein MFR(A) is a first melt flow rate of a homopolymer formed by polymerizing propylene monomers in the presence of the Ziegler-Natta catalyst and the first external electron donor, and wherein MFR(B) is a second melt flow rate of a homopolymer formed by polymerizing propylene monomers in the presence of the Ziegler-Natta catalyst and the second external electron donor, and wherein the MFR(A) is lower than the MFR(B).

EXAMPLE

A high activity catalyst system known to produce highly crystalline isotactic polypropylene with very high yield, 30 to 45 kg polymer per g of catalyst solids, was selected for trial in a commercial scale polypropylene facility that included a CSTR pre-contacting pot ("PCP"), a pre-polymerization loop reactor downstream of the PCP, and a primary polymerization slurry loop reactor downstream of the pre-polymerization reactor. In a first attempt, a Generation V Ziegler-Natta catalyst having a succinate internal donor, triethylaluminum activator, and external electron donors were pre-contacted continuously in the PCP for a residence time of 10 to 20 minutes. The resulting activated catalyst was then injected into a high velocity refrigerated monomer stream containing propylene, propane, hydrogen, at approximately 7° C. Within several minutes of initiating the flow of catalyst solids, the catalyst injector plugged at the point where the activated catalyst came into contact with the refrigerated monomer. This process was repeated multiple times with the same result.

The process was then reconfigured such that the activator and external electron donor were allowed to continue flowing through the prior flow path (i.e., first to the PCP and then into the refrigerated monomer stream of the pre-polymerization reactor via the catalyst injector) and the catalyst solids were diverted to a secondary refrigerated monomer stream via a secondary catalyst injector, completely bypassing the activator pre-contacting step. Despite the lack of pre-contacting, the catalyst became adequately activated in the pre-polymerization reactor with sufficient pre-polymerization yield (>250 g polymer/g catalyst solids) to ensure acceptable product granule morphology (unbroken polymer particles and low quantity of fines), and external electron donor complexation was sufficient to provide the desired product crystallinity with no difference in product properties of significance.

The polymer produced in the above-described reconfigured process compared favorably to samples made with the same catalyst system in a pilot plant employing the catalyst and activator pre-contacting step. In the following Table 1, polymer samples produced in four example runs, in which the catalyst bypassed the PCP, is compared to two polymer samples produced in two pilot plant scale runs in which the catalyst was allowed to pre-contact the activator for a typical residence time of 10 to 20 minutes in the PCP before injection into the reactor. In the comparative examples, inerts were added to the catalyst feed to enable injection of the pre-activated catalysts without unmanageable plugging.

TABLE 1

|  | Comparative 1 | Comparative 2 | Example 1 | Example 2 | Example 3 | Example 4 |
| --- | --- | --- | --- | --- | --- | --- |
| Process scale | Pilot Plant | Pilot Plant | Pilot Plant | Commercial Scale Plant | Commercial Scale Plant | Commercial Scale Plant |
| Pre-contacting pot Bypass | No | No | YES | YES | YES | YES |
| Melt Flow Rate (g/10 min)[1] | 2.0 | 2.2 | 1.6 | 1.9 | 2.0 | 2.65 |
| Poly Dispersity Indiex (PDI)[2] | 8.3 | 8.4 | 8.4 | 8 | 8.6 | 8.6 |
| Zero Shear Viscosity at 190° C. (Pa-s) | 31000 | 28800 | 40200 | 33800 | 30200 | 25300 |
| Tan Delta at 190° C. at 0.01 rad/s | 3.6 | 3.8 | 3.5 | 3.64 | 3.7 | 3.9 |
| Relaxation time at 190° C. (seconds) | 4.4 | 4.4 | 6.3 | 4.4 | 3.8 | 4.5 |

In the foregoing table, Melt Flow Rate was measured as per ASTM D1238. Poly dispersity index was measured from oscillatory shear rheology at 190° C., using the cross-over frequency and modulus for the G' and G", as per Zeicher and Patel (G. R. Zeichner and P. D. Patel, Proceedings of the 2$^{nd}$ World Congress on Chemical Engineering 6:333). Zero shear viscosity, Tan delta, and relaxation time are measured by oscillatory shear rheology as measured at 190° C. The PDI, zero shear viscosity, tan delta and relaxation time are similar for the polypropylene made with and without pre-contacting in the pilot plant and without pre-contacting in the commercial scale plant.

It has therefore been demonstrated that suitable activation of highly active catalyst systems can be achieved without any pre-contacting time. It is envisioned that other injection schemes can also be employed, including those disclosed herein, that similarly allow for activation of the catalyst in situ the reactor without any pre-contacting time. Further, it is envisioned that injection schemes that allow only minimal pre-contacting time, e.g., schemes that allow some pre-activation of a portion of the catalyst feed prior to injection into the reactor, may achieve some or all of the advantages of avoiding pre-contacting. For example, pre-contacting time may be limited to less than 1 minute, or even more preferably less than 10 seconds or less than 5 seconds of pre-contacting time.

Figure 2:
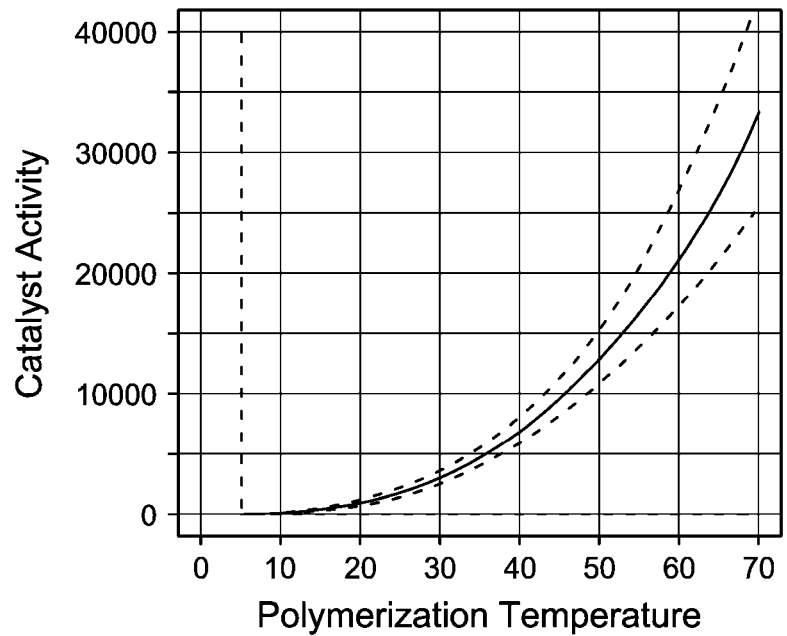
FIG. 2 illustrates a regression curve of catalyst activity of catalyst system A, a Generation IV Ziegler-Natta catalyst system.

FIG. 1 shows a temperature vs. catalyst activity plot for two highly active catalyst systems, one of which was utilized in producing the polymers of Examples 1 to 4 (highly active catalyst system B). The highly active catalyst system A, which is a Generation IV Ziegler-Natta catalyst system having a phthalate internal donor, can be injected to the pre-polymerization reactor of the previously described commercial scale plant after 10 to 20 minutes pre-contacting time; however, reaction conditions must generally be significantly tempered to avoid plugging. As illustrated in FIG. 2, when regressing the catalyst activity data to estimate the activity of the catalyst at the injection site, the standard adjusted catalyst activity of the highly active catalyst system A (i.e., the catalyst activity at approximately 5° C. monomer feed stream temperature and 10 to 20 minutes of pre-contacting time of the catalyst and activator) is approximately 20 gPgcat$^{-1}$hr$^{-1}$, with a margin of error extending from about 10 gPgcat$^{-1}$hr$^{-1}$ to about 40 gPgcat$^{-1}$hr$^{-1}$. This catalyst system had a catalyst activity of greater than 20,000 gPgcat$^{-1}$hr$^{-1}$ at 70° C.

Figure 3:
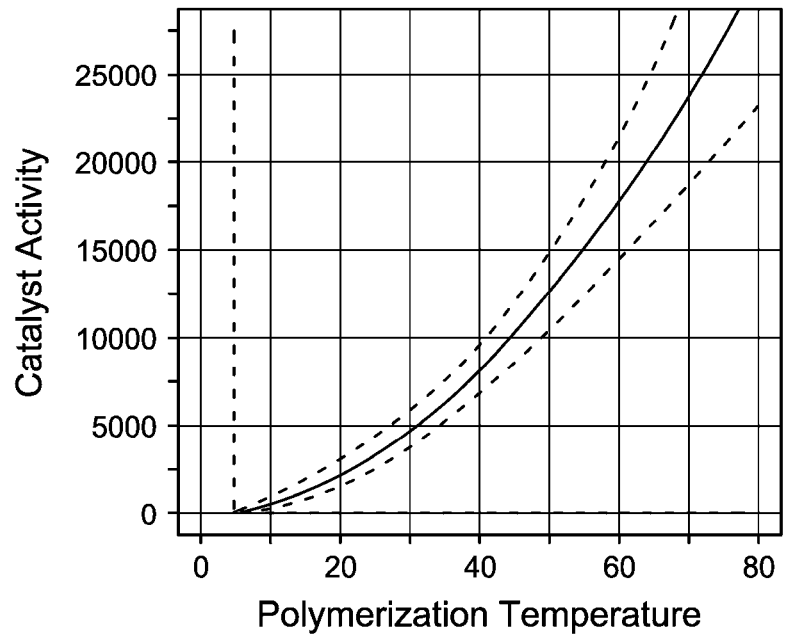
FIG. 3 illustrates a regression curve of catalyst activity catalyst system B, a Generation V Ziegler-Natta catalyst system.

As illustrated in FIG. 3, when regressing the catalyst activity data to estimate the activity of the catalyst at the injection site, the standard adjusted catalyst activity of the highly active catalyst system B (i.e., the catalyst activity at approximately 5° C. monomer feed stream temperature and 10 to 20 minutes of pre-contacting time of the catalyst and activator) is approximately 160 gPgcat$^{-1}$hr$^{-1}$, with a margin of error extending as low as 70 gPgcat$^{-1}$hr$^{-1}$. This catalyst system had a catalyst activity of greater than 20,000 gPgcat$^{-1}$hr$^{-1}$ at 70° C. Because injector plugging occurred with this catalyst system at these injection conditions, it is predicted that other catalyst systems having similar or greater standard adjusted catalyst activity will likewise exhibit plugging under the same injection conditions and environment. Furthermore, because the highly active catalyst system achieves suitable activation without any pre-contacting time, it is predicted that catalysts having higher standard adjusted catalyst activity should similarly achieve suitable activation without pre-contacting. Similarly, it is predicted that catalyst systems having standard adjusted catalyst activity of greater than 10 gPgcat$^{-1}$hr$^{-1}$ can achieve sufficient activation without complete pre-activation, particularly using limited pre-contacting time, e.g., less than 10 seconds of pre-contacting time.

All documents described herein are incorporated by reference herein, including any priority documents, related applications and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, "comprising" encompasses the terms "consisting essentially of," "is," and "consisting of" and anyplace "comprising" is used "consisting essentially of," "is," or "consisting of" may be substituted therefor.

What is claimed is:

1. A method for polymerizing an olefin monomer in a reactor with a highly active polyolefin polymerization catalyst system comprising:
   introducing a catalyst system comprising a catalyst and a catalyst activator into the reactor containing the olefin monomer with less than 10 seconds or no pre-contacting time of the catalyst and the catalyst activator prior to introducing the catalyst and the catalyst activator into the reactor, wherein the catalyst is injected into a first monomer-containing stream and the catalyst activator is injected into a second monomer-containing stream;
   wherein the catalyst system has a standard adjusted catalyst activity of greater than 10 gPgcat$^{-1}$hr$^{-1}$.

2. The method of claim 1, further comprising producing a polyolefin polymer.

3. The method of claim 1, wherein the reactor is a pre-polymerization reactor.

4. The method of claim 1, wherein the reactor is a slurry loop reactor.

5. The method of claim 1, wherein the olefin monomer is propylene.

6. The method of claim 1, wherein the reactor further contains a second monomer.

7. The method of claim 6, wherein the second monomer is ethylene or a $C_4$-$C_{10}$ olefin.

8. The method of claim 1, wherein the activator is a metal alkyl activator.

9. The method of claim 8, wherein the metal alkyl activator is triethylaluminum.

10. The method of claim 1, further comprising introducing an external donor system into a reactor, wherein the external donor influences the stereoregularity of a resulting polymer.

11. The method of claim 10, wherein the catalyst is pre-contacted with the external donor system.

12. The method of claim 11, wherein the catalyst and the external donor system are pre-contacted for less than 10 seconds.

13. The method of claim 10, wherein the activator and external donor system are mixed before brought into contact with the catalyst.

14. The method of claim 1, wherein the catalyst and the catalyst activator are separately introduced into a catalyst feed conduit upstream of an injector feeding the catalyst and the catalyst activator into the reactor.

15. The method of claim 1, wherein the catalyst and the catalyst activator are separately introduced into the reactor.

16. The method of claim 1, wherein the catalyst system has a standard adjusted catalyst activity of greater than 40 gPgcat$^{-1}$hr$^{-1}$.

17. The method of claim 1, wherein the catalyst system has a standard adjusted catalyst activity of greater than 70 gPgcat$^{-1}$hr$^{-1}$.

18. The method of claim 1, wherein the catalyst has an aromatic internal donor.

19. The method of claim 18, wherein the aromatic internal donor is a phthalate.

20. The method of claim 18, wherein the non-aromatic internal electron donor comprises a $C_1$-$C_{20}$ diester of a substituted or unsubstituted $C_2$-$C_{10}$ dicarboxylic acid.

21. The method of claim 20, wherein the non-aromatic internal electron donor is a succinate according to the formula:

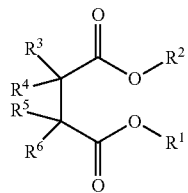

wherein $R^1$ and $R^2$ are independently $C_1$-$C_{20}$ linear or branched alkyl, alkenyl, or cycloalkyl hydrocarbyl radicals; and $R^3$ to $R^6$ are, independently, hydrogen, halogen, or $C_1$-$C_{20}$ linear or branched alkyl, alkenyl, or cycloalkyl hydrocarbyl radicals, wherein the $R^3$ to $R^6$ radicals are not joined together, or wherein at least two of the $R^3$ to $R^6$ radicals are joined to form a cyclic divalent radical, or a combination thereof.

* * * * *